United States Patent [19]

Sako et al.

[11] 4,173,033
[45] Oct. 30, 1979

[54] POLYMERIC DIELECTRIC FOR CAPACITORS AND THE LIKE CONSISTING ESSENTIALLY OF A VINYLIDENE FLUORIDE-TRIFLUOROETHYLENE COPOLYMER

[75] Inventors: Junichi Sako, Suita; Masayoshi Tatemoto, Ibaraki; Shoji Kawachi, Amagasaki; Toshiharu Yagi, Higashiosaka, all of Japan

[73] Assignee: Daikin Kogyo Co., Ltd., Osaka, Japan

[21] Appl. No.: 889,000

[22] Filed: Mar. 22, 1978

Related U.S. Application Data

[63] Continuation-in-part of Ser. No. 745,532, Nov. 29, 1976, abandoned.

[30] Foreign Application Priority Data

Dec. 4, 1975 [JP] Japan .................................. 50-145617
Nov. 30, 1976 [GB] United Kingdom ............... 49847/76
Dec. 3, 1976 [DE] Fed. Rep. of Germany ....... 2654980
Dec. 3, 1976 [FR] France ................................ 76 36584

[51] Int. Cl.² ............................................. H01B 3/44
[52] U.S. Cl. ................................... 361/323; 252/63.2; 526/255
[58] Field of Search ................. 252/63.2, 66; 361/323; 526/255

[56] References Cited

U.S. PATENT DOCUMENTS

| | | | |
|---|---|---|---|
| 2,456,255 | 12/1948 | Coffman et al. | ...................... 526/255 |
| 3,193,539 | 7/1965 | Hauptschein | .................... 526/255 X |
| 3,833,503 | 9/1974 | Murayama et al. | ............ 252/63.2 X |
| 3,991,451 | 11/1976 | Maruyama et al. | ............. 361/323 X |
| 4,076,929 | 2/1978 | Dohany | ............................ 252/66 X |

*Primary Examiner*—Harris A. Pitlick
*Attorney, Agent, or Firm*—Stevens, Davis, Miller & Mosher

[57] ABSTRACT

A polymeric dielectric having an outstanding dielectric constant, which essentially consists of a copolymer of vinylidene fluoride and triflouroethylene in a molar ratio of from about 95:5 to 10:90, preferably of from about 85:15 to 20:80, more preferably of from about 75:25 to 35:65.

5 Claims, 7 Drawing Figures

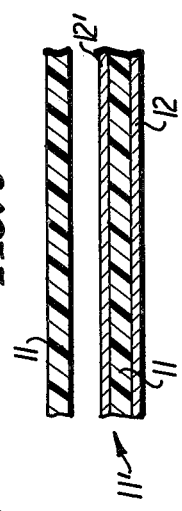
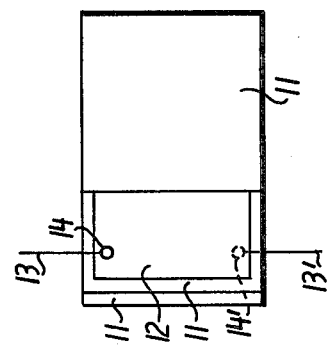
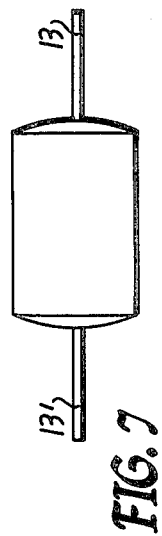
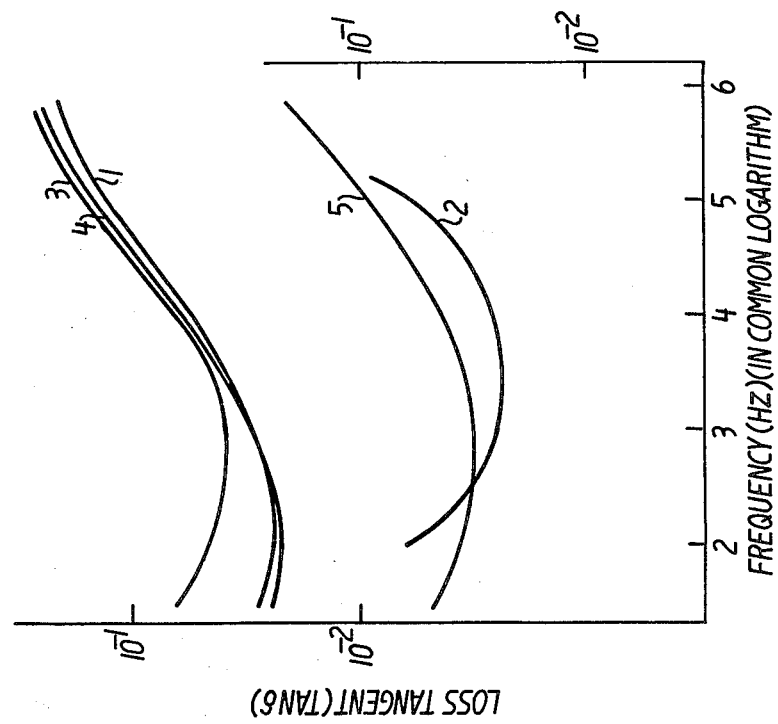

POLYMERIC DIELECTRIC FOR CAPACITORS AND THE LIKE CONSISTING ESSENTIALLY OF A VINYLIDENE FLUORIDE-TRIFLUOROETHYLENE COPOLYMER

This is a continuation-in-part application of our copending application Ser. No. 745,532, filed Nov. 29, 1976, now abandoned.

The present invention relates to a polymeric dielectric having an outstanding dielectric constant. More particularly, it relates to a polymeric dielectric highly improved in dielectric property and suitable for the manufacture of various electronic instruments and apparatuses, particularly capacitors.

In recent years, miniaturization of electronic instruments and apparatuses is highly sidered, and naturally miniaturization of capacitors as the parts to be incorporated therein is also desired. While the capacity of a capacitor is much influenced by the kind of a dielectric to be inserted between the electrodes, conventional dielectrics such as impregnated papers are not sufficiently high in their dielectric constants so that the miniaturization of a capacitor has a certain limit insofar as those conventional dielectrics are used. In order to realize the further miniaturization, there have recently been made some proposals to use polymeric materials as dielectrics. Among them, polyvinylidene fluoride is known to have a particularly high dielectric constant.

As the result of the extensive study on polymeric dielectrics including polyvinylidene fluoride, it has now been surprisingly and unexpectedly found that the modification of a vinylidene fluoride polymer with trifluoroethylene to a certain extent results in the extreme enhancement of the dielectric constant. The present invention is based on this finding.

BRIEF DESCRIPTION OF THE DRAWINGS

FIG. 3 shows the variation of loss tangent with frequency.

FIG. 4 shows a cross-sectional view of a film capacitor.

FIG. 5 shows an enlarged cross-sectional view of part (A) in FIG. 4.

FIG. 6 shows a plane view of the film capacitor shown in FIG. 4.

FIG. 7 shows an outer view of the film capacitor shown in FIG. 4.

Figure 2:
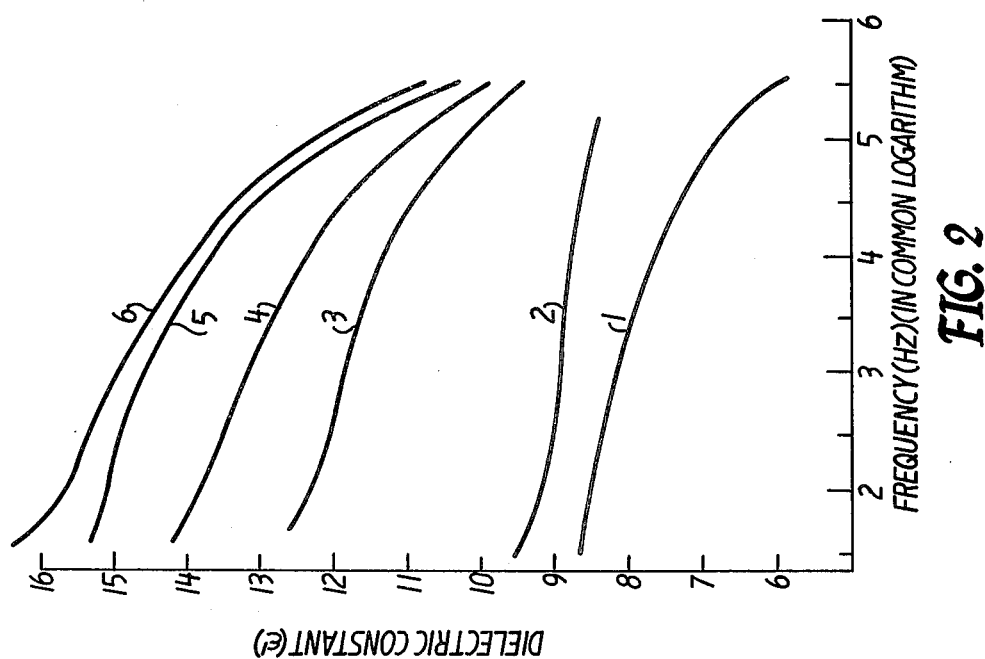
FIG. 2 shows the variation of dielectric constant with frequency.
Figure 1:
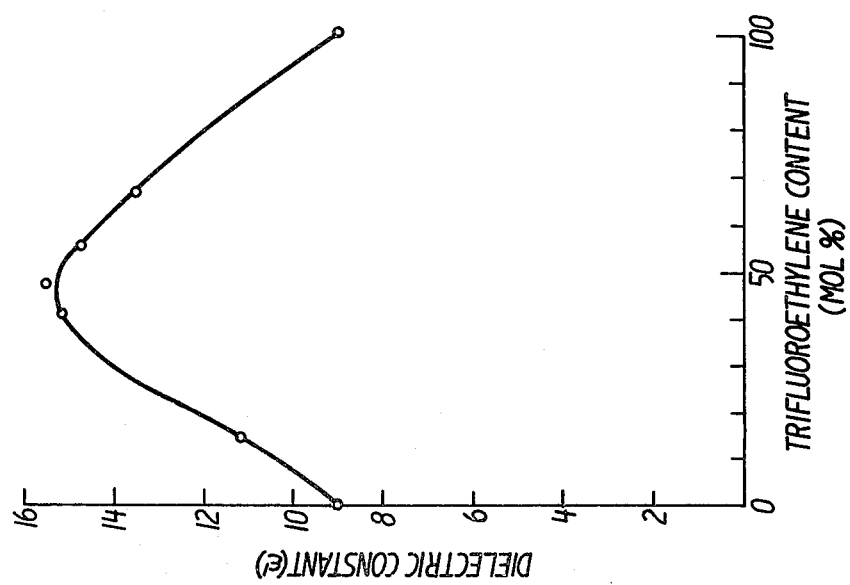
FIG. 1 shows the variation of dielectric constant with trifluoroethylene content.

The electrical characteristics of the vinylidene fluoride-trifluoroethylene copolymer may be understood from FIGS. 1 to 3 of the accompanying drawings. The graphs of these Figures were obtained from the results of the measurements on the electrical characteristics of vinylidene fluoride-trifluoroethylene copolymers as well as polyvinylidene fluoride and polytrifluoroethylene, which were prepared in the similar manner to the procedure as hereinafter exemplified. On the measurements, the specimens of the copolymers and the homopolymers were prepared by the following procedure: placing polymer powders on the flat surface of a mold, heating the powders together with the mold by a heat press of 280° C. for 15 minutes, pressing them using the heat press under a pressure of 30 kg/cm$^2$ for 1 minute and applying water thereto to cool rapidly to make a sheet of about 1 mm in thickness. The dielectric constants were measured according to the method as described in ASTM (American Society for Testing and Materials) D-150 at a temperature of 22±2° C.

FIG. 1 shows the variation of the dielectric constant measured at a frequency of 1 KHz on the ordinate ($\epsilon'$) with the change of the trifluoroethylene content in the vinylidene fluoride-trifluoroethylene copolymer on the abscissa (mol %). From this Figure, it is seen that the copolymer having a trifluoroethylene content of 5 to 90 mol %, particularly of 15 to 80 mol %, more particularly of 25 to 65 mol %, possesses a much higher dielectric constant than polyvinylidene fluoride which is known to possess presently the highest dielectric constant among various polymeric materials.

In FIG. 2 showing the variation of the dielectric constant on the ordinate ($\epsilon'$) with the change of the frequency on the abscissa (Hz in common logarithm), the curves (1), (2) and (3) to (6) correspond respectively to polytrifluoroethylene, polyvinylidene fluoride and vinylidene fluoride-trifluoroethylene copolymers having trifluoroethylene contents of 15, 64, 56 and 40 mol %.

In FIG. 3 showing the variation of the loss tangent in the ordinate (tan δ) with the frequency on the abscissa (Hz in common logarithm), the curves (1), (2) and (3) to (5) correspond respectively to polytrifluoroethylene, polyvinylidene fluoride and vinylidene fluoride-trifluoroethylene copolymers having trifluoroethylene contents of 64, 56 and 15 mol %.

According to the present invention, there is provided a polymeric dielectric having an outstanding dielectric constant, which essentially consists of a copolymer of vinylidene fluoride and trifluoroethylene in a molar ratio of from about 95:5 to 10:90, preferably of from about 85:15 to 20:80, more preferably of from about 75:25 to 35:65.

The vinylidene fluoride-trifluoroethylene copolymer of the invention may be produced by polymerization of vinylidene fluoride and trifluoroethylene according to a per se conventional procedure. Since the reactivity ratios of vinyldene fluoride and trifluoroethylene in the copolymerization, for example, at an ambient temperature are respectively 0.7 and 0.5 and therefore the proportion of these ratios is close to 1, those monomers may be subjected to polymerization in a molar ratio nearly equal to the desired molar ratio of the monomeric units in the copolymer to be produced.

A typical example of the procedure for production of the vinylidene fluoride-trifluoroethylene copolymer is as follows (the relationship between volume and weight corresponding to that between milliliter and gram):

Into a pressure resistant reaction vessel having a 200 parts by volume, charged with 40 parts by weight of trifluorotrichloroethane and 0.16 part by weight of di-(3,5,6-trichloroperfluorohexanoyl) peroxide and kept below 0° C., 20.5 parts by weight of trifluoroethylene and 17.5 parts by weight of vinylidene fluoride are charged under pressure, and the reaction vessel is immersed into a water tank of 20° C., whereby the polymerization is initiated. The pressure in the reaction vessel is elevated to 20 kg/cm$^2$G at the highest and then lowered to 7.5 kg/cm$^2$G 12 hours after the initiation. From the reaction mixture, 29 parts by weight of a vinylidene fluoride-trifluoroethylene copolymer is recovered as a white clump, which is pulverized in water by the aid of a mixer and dried to give fine granules. By the material balance between the starting monomers and the produced copolymer and also by the elementary analysis, the trifluoroethylene content in the copolymer is confirmed to be about 46 mol %. The intrinsic viscosity of the copolymer when measured on its dimethylformamide solution is 1.8 (100 ml/g at 35° C.). The analysis by a differential scanning calorimeter (manufactured by Rigaku Denki Co., Ltd.) reveals that the crystal melting point is 162° C. and the initiating temperature of the thermal decomposition is 338° C. The copolymer is readily soluble in acetone and dimethylformamide and can be film-cast from its solution in such solvents.

The vinylidene fluoride-trifluoroethylene copolymer of the invention is a thermoplastic resin usually in a translucent solid and soluble in many kinds of solvents than those into which polyvinylidene fluoride is soluble.

The following table shows the melting points and the specific gravities of vinylidene fluoride-trifluoroethylene copolymers having different molar ratios of vinylidene fluoride and trifluoroethylene, compared with those of polyvinylidene fluoride and polytrifluoroethylene. As understood from the table, the copolymer of vinylidene fluoride and trifluoroethylene has a minimum melting point at a molar ratio between about 95:5 and about 85:15:

| Molar ratio of VdF/3FH[1] | Melting point (°C.)[2] | | Specific gravity |
|---|---|---|---|
| | Powder | Film | |
| 100/ 0 (PVdF) | 176.2 | 175.8 | 1.7665 |
| 98/ 2 | 159.3 | 159.9 | 1.7852 |
| 90/10 | 142.1 | 146.7 | 1.8206 |
| 85/15 | 149.6 | 149.4 | 1.8663 |
| 60/40 | 155.5 | 155.2 | 1.8947 |
| 54/46 | 161.5 | 160.2 | 1.8947 |
| 44/56 | 161.6 | 163.8 | 1.9233 |
| 36/64 | 167.6 | 165.7 | 1.9296 |
| 0/100 (P3FH) | 198.3 | 199.4 | 1.9905 |

Notes:
[1] The copolymers and the homopolymers were prepared in the similar manner to the procedure as hereinabove exemplified. VdF, vinylidene fluoride; 3FH, trifluoroethylene; PVdF, polyvinylidene fluoride (the melting points described in known literatures being 162°-182° C.); P3FH, polytrifluoroethylene.
[2] The melting points were measured by a differential scanning calorimeter.

The vinylidene fluoride-trifluoroethylene copolymer of the invention can be shaped into various forms by conventional melt molding techniques (e.g. compression molding, extrusion molding, injection molding). Alternatively, it may be dissolved or dispersed into a liquid medium at room temperature or an elevated temperature, followed by application of the resulting solution or dispersion onto a substrate material to make a film. As another alternative way, it may be powder-coated onto the surface of a substrate material to make a coating layer.

A dielectric to be used for capacitors is desired to have not only a high dielectric constant but also a sufficient insulating property. The vinylidene fluoridetrifluoroethylene copolymer of the invention has an outstanding dielectric constant as shown above. Moreover, since the copolymer has a volume resistivity of $2 \times 10^{13}$ to $5 \times 10^{14}$ Ω.cm and a dielectric strength of 9 to 12 KV/mm (when measured with a film of 0.1 mm thick) over that range of the molar ratio of vinylidene fluoride units and trifluoroethylene units as defined above, its insulating property is sufficiently high. Thus, the copolymer of the invention is highly useful as a dielectric for capacitors. When directed to such use, it is usually constructed in the form of a film capacitor. For instance, a film of the copolymer of the invention is superposed on a metal foil available as an electrode and the superposed product is wound up to make a cylindrical body. Instead of using a metal foil, an appropriate metal available as an electrode may be vacuum evaporated onto the surface of a film of the copolymer of the invention to make a metal coating layer, followed by winding up to obtain a cylindrical body. From the viewpoint of miniaturization of a capacitor, the adoption of the latter procedure is favorable. Examples of the metal of which the metal foil or the metal coating layer available as an electrode is made are aluminum, silver, nickel, etc.

A typical example of the film capacitor will be hereinafter illustrated with reference to the accompanying drawings wherein:

FIG. 4 shows a cross-sectional view of a film capacitor, prepared by winding up a superposed product consisting of a film of the copolymer of the invention and another film of such copolymer having a metal coating layer on each of both surfaces, in the state that its terminal edge is drawn out;

FIG. 5 shows an enlarged cross-sectional view of the part (A) of the film capacitor shown in FIG. 4;

FIG. 6 shows a plane view of the film capacitor shown in FIG. 4 from the direction indicated by an arrow; and FIG. 7 shows an outer view of the film capacitor shown in FIG. 4 but in the finished state.

In these Figures, (11) indicated a film of the copolymer of the inventon, and (11') indicates a film composed of the said film (11) and metal coating layers (12), (12') provided on both surfaces of such film. The metal coating layer has usually a thickness of about 0.05 to 2μ and is formed by vacuum evaporation of a metal. As shown in FIGS. 4 and 5, the film (11) is superposed on the film (11'), and the superposed product is wound up to make a cylindrical body. As shown in FIG. 6, the metal coating layers (12) and (12') (the latter being in hiding) available as the electrodes are respectively connected to lead wires (13) and (13') at connecting points (14) and (14'). The capacitor of the finished state as shown in FIG. 7 wherein (13) and (13') are lead wires works according to the rule of electricity, and its capacity can be calculated by the following equation:

$$C = \epsilon' \times 0.08855 \times S/d \times 10^{12}$$

wherein C is the capacity (F) of the capacitor, $\epsilon'$ is the dielectric constant of the copolymer, S is the surface area (cm$^2$) of the electrode and d is the thickness (cm) of the film of the copolymer.

Besides, the copolymer of the invention has notable piezoelectricity, electro-strictivity, pyroelectricity, thermal conductivity, photoconductivity, etc. and is useful as an element utilizing these characteristic properties for various electronic instruments and apparatuses.

Still, the copolymer of the invention may be considered to have an interesting innermolecular structure of high polarity in view of the outstanding dielectric constant.

What is claimed is:

1. A polymeric dielectric in film form having an outstanding dielectric constant, which essentially consists of a copolymer of vinylidene fluoride and trifluoroethylene in a molar ratio of from about 75:25 to 35:65.

2. A process for making an electronic apparatus comprising dielectric materials which comprises shaping a copolymer of vinylidene fluoride and trifluoroethylene in a molar ratio of from about 75:25 to 35:65 into a film for the dielectric material.

3. The process according to claim 2, wherein the shaping is effected by molding the copolymer in a melt state.

4. The process according to claim 2, wherein the shaping is effected by coating the copolymer in a solution onto a substrate material.

5. A capacitor comprising a polymeric dielectric in film form according to claim 1.

* * * * *